April 4, 1939.  C. R. DOWDY ET AL  2,152,880

THICKNESS GAUGE

Filed March 11, 1936

INVENTORS
Charles R. Dowdy and Fred Doefke
Deceased
By Annie Doefke, Fred C. Doefke and William J. Howe
Executors
By
Wheeler, Wheeler and Wheeler
— ATTORNEYS

Patented Apr. 4, 1939

2,152,880

UNITED STATES PATENT OFFICE 2,152,880

THICKNESS GAUGE

Charles R. Dowdy, Milwaukee, Wis., and Fred Doepke, deceased, late of St. Petersburg, Fla., by Annie Doepke, Fred C. Doepke, and William G. Hanson, executors, Milwaukee, Wis., assignors to Wrought Washer Manufacturing Company, Milwaukee, Wis., a corporation of Wisconsin Application March 11, 1936, Serial No. 68,250

5 Claims. (Cl. 33—147)

Our invention relates to improvements in thickness gauges.

The object of our invention is to provide a thickness gauge wherein the possible inaccuracy of indication of the thickness of material to be gauged is reduced.

More particularly stated, it is the object of our invention to provide thickness gauges in which the mechanical elements between the actual work engaging members and the pointer on the indicator dial associated therewith are directly abutting and are divorced from the mechanical members in the control of the person using the gauge whereby to minimize the effect of variations of pressure or differences in the strength used in applying or working the instrument.

Another object of our invention is to provide a thickness gauge which enables an operator to gauge successive pieces of material with extreme rapidity without sacrificing accuracy of gauge indication.

In the drawing.

Like parts are designated by the same reference characters throughout the several views.

Figure 1:
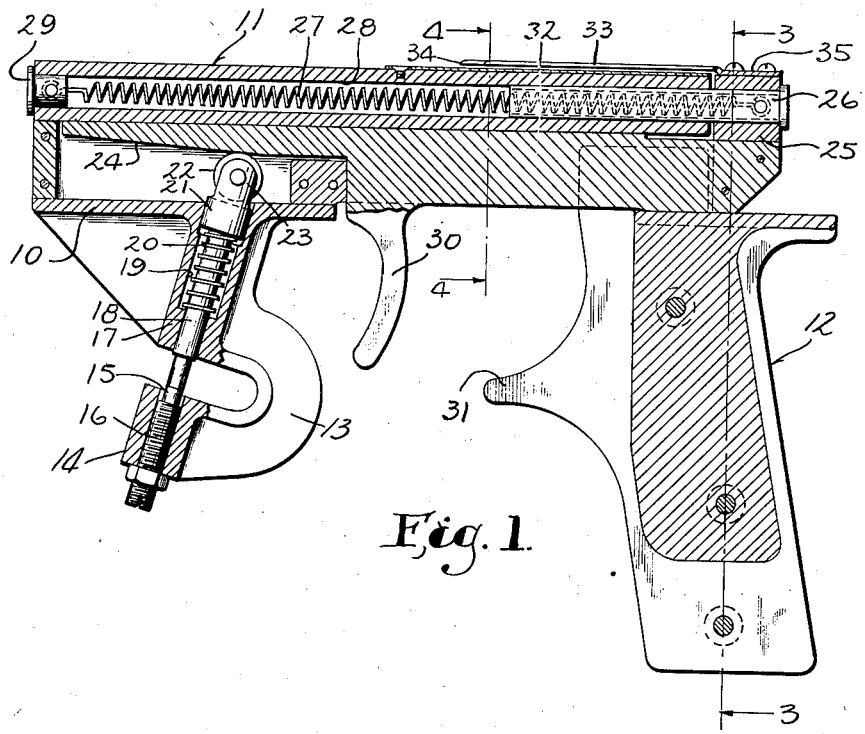
Fig. 1 is a side elevation of a pistol-shaped thickness gauge embodying our invention, portions of the device being shown in vertical section.
Figure 2:
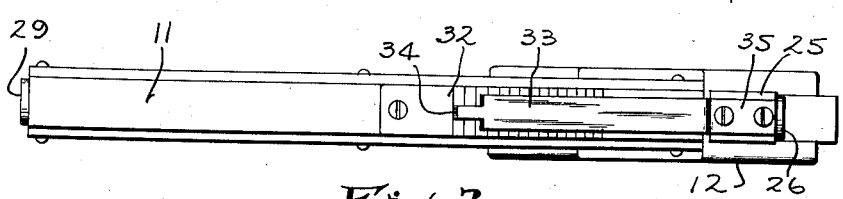
Fig. 2 is a plan view of the device shown in Fig. 1.
Figure 3:
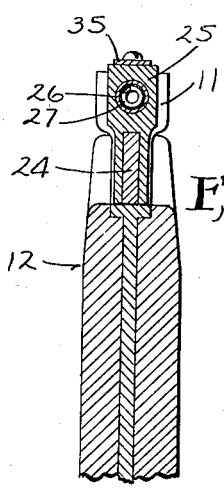
Fig. 3 is a section on line 3—3 of Fig. 1.
Figure 4:
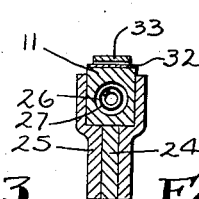
Fig. 4 is a section on line 4—4 of Fig. 1.

Our gauge shown in Figs. 1 to 4, inclusive, is designed to fit the hand of the user and has the general outward appearance of a pistol. The frame 10 includes a barrel-shaped portion 11 and a pistol grip handle portion 12. Beneath the barrel 11 and disposed at a convenient angle with respect to the handle or grip 12 is a C jaw 13 into the lower leg 14 of which is fitted a fixed anvil 15 forming part of a screw 16 in threaded engagement with the leg 14. The screw 16 is provided with a lock nut to facilitate positive adjustment of the anvil 15. In the upper leg 17 of the C jaw 13 is a bore for the reception of a gauge plunger 18 in axial alignment with the axis of the anvil 15 and it is between the anvil 15 and the movable plunger 18 that the material to be gauged is received. An enlarged bore at 19 provides space for a plunger spring 20 which bears against the leg 17 at one end and against a roller head 21 at the upper end of the gauge plunger. The gauge plunger is therefore normally urged upwardly, away from the anvil 15, and a roller 22 mounted on a pin between spaced ears 23 forming part of the roller head 21 is urged into engagement with a wedge piece 24 mounted for reciprocation in the frame 10.

At the rear or handle end of the frame 10 the wedge piece 24 is rigidly secured to a cross head 25 which is not only secured to the wedge piece 24, but also to a barrel guide 26 extending into the bore of the barrel 11. A main spring 27 extending through the bore 28 of the barrel 11 is secured to a plug 29 at the forward end of the barrel and in tension relation to the barrel guide 26 at the rear end thereof. The wedge piece 24 is therefore constantly urged toward the forward end of the frame 11 by the main spring 27 and it will be understood from this description that the main spring 27 is therefore opposed to the plunger spring 20 which is lightly resilient and easily overcome by the greater strength of the spring 27. The plunger spring 20 has only sufficient strength to positively urge the roller head 21 and the plunger 18 upwardly when the wedge piece 24 is moved rearwardly to relieve the pressure against the roller 22.

At 30 and forming part of wedge piece 24, we provide a trigger conveniently placed with reference to the handle 12 so that the user of our thickness gauge may hold and operate the gauge with as great ease and convenience as he could hold and operate a revolver or pistol. A horn 31 upon the handle 12 provides for convenient and natural separation and disposition of the fingers of the user.

Disposed upon the upper surface of the barrel 11 of our gauge we provide a calibrated strip 32 in overlying relation to which a pointer 33 with knife edge 34 is disposed, and this pointer 33 is rigidly secured at 35 to the cross head 25, thus providing an accurate indication of the extent of displacement of the wedge piece 24. We therefore provide an accurate indication of the extent of displacement of the plunger 18 and provide a "reading" in terms of gauge or fractions of an inch according to the axial displacement of the plunger 18 with reference to the anvil 16.

From the description of our thickness gauge as above set forth, it will be seen that any sheet of material between the anvil 15 and movable plunger 18 will, when pressed by the movable plunger under the urge of main spring 27, so position the wedge 24 as to give a positive reading by means of pointer 34. In each instance the position of the pointer involves possible elements of inaccuracy only with reference to the bearing of the roller 22 against the wedge 24, and since the relative movement of the wedge is great by reason of the large ratio of movement thereof with reference to the range of movement of the plunger, we have found that the reading upon the calibrated dial is extremely accurate. This is especially true because of the fact that the strength of the operater is not reflected at all in the pressure brought to bear on the movable plunger 18. The only pressure effective for this purpose is the pressure of the main spring 27 against the resistance of the lighter spring 19.

We claim:

1. A thickness gauge including a frame and opposed members for contacting material to be gauged, one of the members being movable toward and away from the other, an indicator wedge guided by the frame and positioned against said movable member provided with a main spring housed within the frame for resiliently urging the members together, and a light spring compressed between the frame and the movable member and opposed to the main spring whereby to urge the movable member toward the wedge.

2. A thickness gauge comprising a barrel frame and handle approximately in pistol configuration, a C jaw, a sliding wedge on the barrel frame, and a movable plunger for the C jaw in contact with the wedge whereby the displacement of the plunger is indicated by the displacement of the wedge, a spring for urging the movable plunger to open the jaw and a stronger spring positioned to urge the wedge to jaw-closed position.

3. A thickness gauge comprising a barrel frame and handle approximately in pistol configuration, a C jaw, and a sliding wedge on the barrel frame, a movable plunger for the C jaw in contact with the wedge whereby the displacement of the plunger is indicated by the displacement of the wedge, the wedge being provided with a trigger adjacent the handle to facilitate withdrawal of the wedge and a spring positioned to urge the plunger toward the wedge.

4. In a thickness gauge having a generally pistol like configuration, including a barrel grip a barrel and a subframe comprising a wedge guide, a C jaw adjacent the subframe, a movable plunger in the C jaw to contact a work piece therein, a wedge reciprocable in the subframe to contact the plunger, a main spring in the barrel and a cross head connecting the main spring and wedge whereby to urge the wedge into intimate contact with the plunger and an indicator to give visual indication of the position of the wedge, and a plunger spring of lesser strength than the main spring for urging the plunger into contact with the wedge.

5. In a thickness gauge having a generally pistol-like configuration including a grip, a barrel, and a sub-frame, a C-jaw adjacent the subframe, a movable plunger in the C-jaw to contact a work piece therein, a wedge reciprocable in the sub-frame and guided by the barrel to contact the plunger, a main spring in the barrel, a cross head connecting the main spring and wedge whereby to urge the wedge into intimate contact with the plunger, and an indicator to give visual indication of the position of the wedge.

ANNIE DOEPKE,
FRED C. DOEPKE,
WILLIAM G. HANSON,
*Executors of the Estate of Fred Doepke, Deceased.*
CHARLES R. DOWDY.